June 16, 1925.

J. W. BOWERBANK

GAS BURNER AND HEATING APPLIANCE

Filed April 5, 1924

1,542,212

INVENTOR:
J. W. Bowerbank
By Chatwin Company
Attys.

Patented June 16, 1925.

1,542,212

UNITED STATES PATENT OFFICE.

JOHN WAINWRIGHT BOWERBANK, OF KIDDERMINSTER, ENGLAND.

GAS BURNER AND HEATING APPLIANCE.

Application filed April 5, 1924. Serial No. 704,537.

*To all whom it may concern:*

Be it known that I, JOHN WAINWRIGHT BOWERBANK, a citizen of the United States of America, residing at Kidderminster, in the county of Worcester, in the Kingdom of England, have invented new and useful Improvements Relating to Gas Burners and Heating Appliances, of which the following is a specification.

The invention relates to improvements in gas heating appliances such as comprise a burner having a regulating valve of mushroom form, adjustable in a vertical guide, the gas issuing and being ignited between the edge of the valve and the periphery of the body of the burner proper.

According to the present invention the burner and burner tube are carried by a pan or plate having a central aperture and a surrounding upstanding rim serving as a heat retaining and deflecting means, the burner proper being disposed above said aperture, and means are provided whereby the burner valve may be adjusted from above and also from below the pan.

The invention is shown in the accompanying drawings in which:—

Figure 1:
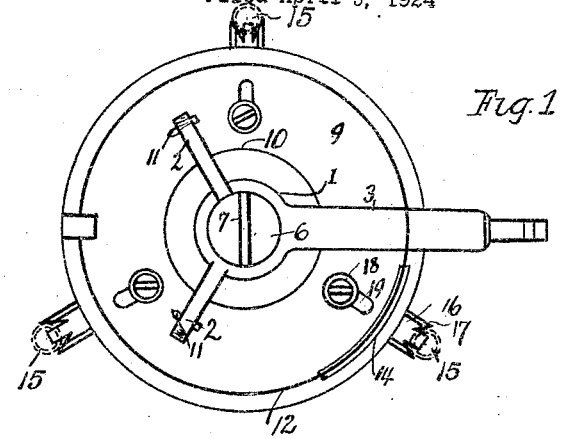
Figure 2:
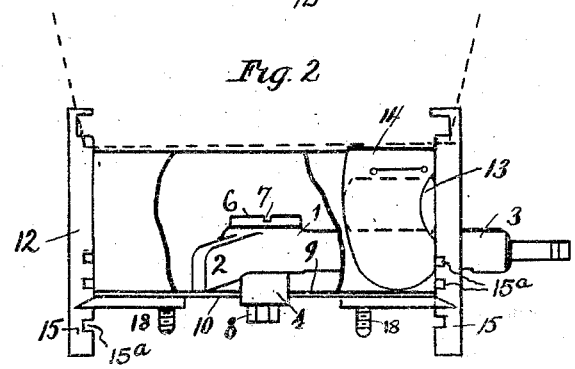
Figure 3:
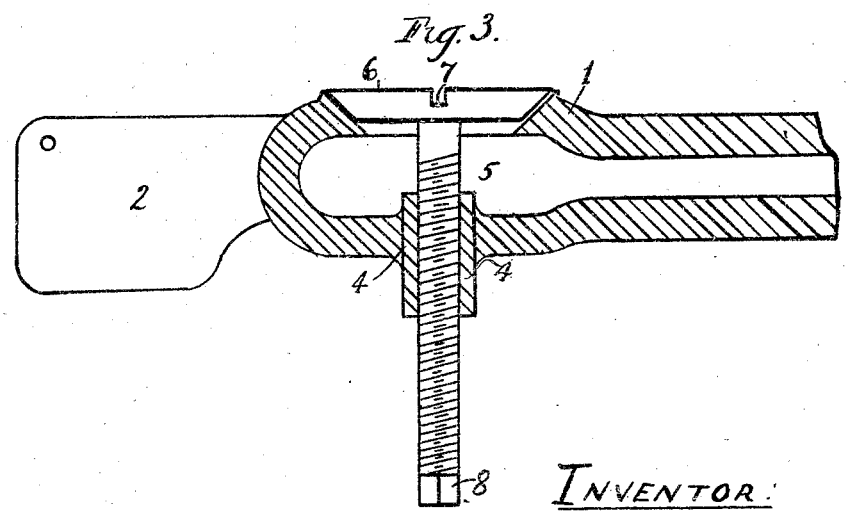

Figure 1 is a plan view of the appliance; Fig. 2 is an elevation, parts being broken away; and Fig. 3 is an enlarged sectional elevation of the improved burner proper.

Referring to the drawings, the body portion 1 of the burner proper is provided with integral securing lugs 2 and inlet tube 3, and has an internally screwed boss or guide 4 in which is mounted the correspondingly screwed stem 5 of the flame regulating valve 6. The valve can be raised or lowered as desired to adjust the size of flame from above or below the appliance by hand or by means of a suitable tool engaging slot 7 in the head thereof or one or more flats 8 formed on the protruding end of the stem respectively. An advantage of this arrangement is that the valve is always perfectly true over its seating and the flame is therefore evenly distributed around the appliance.

The burner is secured to the pan bottom 9 above the central aperture 10 thereof by means of pins 11 engaging lugs 2, and the inlet tube 3 passes through the upstanding wall 12 of the pan. Said wall is provided with an aperture 13 having a sliding door 14 for the purpose of igniting or inspecting the gas flame, and the appliance is adapted to be mounted on legs and positioned beneath a pot, boiler, or otherwise applied to any other domestic apparatus requiring heat.

In Fig. 2 the heater is shown beneath a boiler indicated by dotted lines, and is mounted upon legs of the boiler stand in such a manner that it may readily be adjusted in height to effect the most efficient utilization of heat. The three legs 15 of a suitable stand are furnished with a plurality of notches or perforations 15$^a$ adapted to be engaged by radially adjustable arms 16 on the pan bottom 9. Each of said arms may advantageously consist of a semi-tubular piece shaped with a tongue 17 at one end for insertion in said notches or perforations, as clearly seen from Fig. 1 in which the legs 15 are indicated by dotted lines for the sake of clearness. Through each arm 16 passes a securing screw 18 adjustable in a slot 19, the down-turned edges of which latter project into the hollow of each arm 16 and form a radial guide for the arm on the pan bottom. The screws 18 may be adjusted from above or below as desired, and it is generally only necessary to loosen one of the arms in order to mount or demount the appliance in the stand.

It will readily be appreciated that in use, air is drawn in through the central perforation 9 in the pan and, an even setting of the flame being secured, the heat is distributed equally over the bottom of the boiler or the like, the walls of the pan retaining the heat therein, preventing the ingress of cold air and generally maintaining a high heating efficiency of the appliance.

I claim:—

A gas heating appliance comprising a burner of the kind described secured centrally upon a bottom plate having an air inlet aperture centrally beneath said burner and an upstanding rim surrounding said burner, means for adjusting the burner valve from above the bottom plate and also from below said plate, radial arms on said plate, means for radially adjusting said arms, and means on said arms inter-engaging with the legs of a stand associated with the vessel to be heated to secure said appliance at different positions in said stand, substantially as described.

JOHN WAINWRIGHT BOWERBANK.